United States Patent
Takase et al.

(10) Patent No.: US 7,373,477 B2
(45) Date of Patent: May 13, 2008

(54) FRAGMENTATION EXECUTING METHOD AND STORAGE DEVICE

(75) Inventors: Makoto Takase, Kanagawa (JP); Minoru Hashimoto, Kanagawa (JP); Toshiroh Unoki, Kanagawa (JP); Toru Aida, Kanagawa (JP); Mariko Kado, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 485 days.

(21) Appl. No.: 11/084,455

(22) Filed: Mar. 17, 2005

(65) Prior Publication Data
US 2005/0210214 A1 Sep. 22, 2005

(30) Foreign Application Priority Data
Mar. 18, 2004 (JP) ............... 2004-078570

(51) Int. Cl.
*G06F 12/00* (2006.01)
(52) U.S. Cl. .............. 711/202; 711/165; 711/170; 711/206
(58) Field of Classification Search .......... None
See application file for complete search history.

(56) References Cited

FOREIGN PATENT DOCUMENTS

JP 10-301721 11/1998

*Primary Examiner*—Donald Sparks
*Assistant Examiner*—Mehdi Namazi
(74) *Attorney, Agent, or Firm*—Townsend and Townsend and Crew LLP; Patrick Duncan

(57) ABSTRACT

When a host apparatus transfers/swaps stored information between user sectors in a storage device for the purpose of defragmentation or the like, the storage device is allowed to perform the data transfer or swap without transmission between the host apparatus and the storage device after the command is received by the storage device; and consistency in stored information identification is maintained between the host apparatus and the storage device even if the operation is interrupted. In one embodiment, information stored in the destination user sector LBA(Y) is copied to the dummy sector LBA(D), its entry is written in the mapping table RDM, information stored in the source user sector LBA(X) is copied to LBA(Y), and then the RDM entry is erased.

19 Claims, 7 Drawing Sheets

FRAGMENTATION EXECUTING METHOD AND STORAGE DEVICE

CROSS-REFERENCES TO RELATED APPLICATIONS

This application claims priority from Japanese Patent Application No. JP2004-078570, filed Mar. 18, 2004, the entire disclosure of which is incorporated herein by reference.

BACKGROUND OF THE INVENTION

The present invention relates to a technique for transferring or swapping data stored in data blocks in randomly accessible storage devices such as magnetic disk drives, magnetic optical disk drives, PC card semiconductor memories and CF card semiconductor memories. More specifically, the invention relates to a technique for performing fragmentation with a decreased burden on the host apparatus at higher speed.

The magnetic disk drive is a random access storage device capable of accessing random storage locations on its magnetic disk or a recording medium. In addition, the drive is a block device performing data input and output in data blocks each having a plurality of bytes. A magnetic disk is divided into a plurality of data blocks of a fixed size formed along circular tracks. The data block is the smallest unit when the host apparatus reads/writes data from/to the magnetic disk drive and usually called the sector. Meanwhile, the cluster is defined as a set of plural sectors and the smallest unit for the host apparatus to manage the storage locations of files on the magnetic disk. Accordingly, any small file uses at least one cluster when the file is recorded on the magnetic disk.

File management of a magnetic disk drive by the host apparatus is done by the operating system (OS). The OS has a file management system which is a mechanism to manage files in a block device through a table to associate files with storage locations. The file management system depends on the OS. Among those available, the FAT file system and the NTFS are for Windows (trademark of Microsoft Co., Ltd.) and the HFS is for MAC (trademark of Apple Computer, Inc.)

The magnetic disk drive typically has a plurality of recording surfaces. Further, each recording surface has a plurality of tracks and each track has a plurality of sectors. When a head accesses a desired sector, CHS parameters (cylinder number/head number/sector number) corresponding to that sector are specified in the magnetic disk drive. On the other hand, it has become common that to manage data storage locations, the host apparatus uses a single parameter called the logical block address (hereinafter denoted as LBA) instead of CHS parameters. For a head to access a desired sector in this case, the magnetic disk drive internally translates the LBA to CHS parameters. Serial LBAs are sequentially allocated to sectors on a one-to-one basis.

Sequential allocation of serial LBAs to a magnetic disk results in serial sectors along each track on either recording surface. A file is a unit of collective information for recording data and programs on a magnetic disk. Contiguous recording of the information constituting a file in serial sectors is favorable to the computer when it accesses the magnetic disk in order to read data or a program into the memory since the magnetic disk drive can reduce the seek time and rotary latency.

However, although at the beginning, a plurality of files can be recorded sequentially and contiguously in sectors or clusters on the magnetic disk, unallocated clusters will occur between consecutive allocated clusters as some files are deleted and individual files are partly deleted. When a new file is recorded, the information constituting the file will be scattered to separate storage locations since the OS tries to use unallocated clusters between allocated clusters in order to make the effective use of the recording space. Fragmentation refers to a condition of the disk in which files recorded thereon are divided into pieces scattered around the disk. Fragmentation also occurs as a result of adding data to a file. Fragmentation makes longer the time to access the magnetic disk drive since the seek time and rotary latency increase.

In order to clear up fragmentation in the magnetic disk device, the host apparatus performs a task called defragmentation. Defragmentation refers to a task which sequentially reallocates scattered file information to contiguous sectors or clusters. To perform defragmentation, the host apparatus must, for example, move data XYZ from cluster A to cluster B. In this case, the host apparatus sends a read command to read data XYZ into the memory of the host apparatus from cluster A and writes data XYZ to cluster B. Then, the host apparatus receives a write completion command from the magnetic disk drive and update the management table so as to change the storage location of data XYZ to cluster B from cluster A. This is because the magnetic disk drive typically performs nothing but to receive a read or write command with a sector LBA from the host apparatus and execute the command. Therefore, to move data stored in a sector on the magnetic disk, the host apparatus reads the data into its memory and then sends to the magnetic disk drive a write command with the destination sector LBA specified. After data is moved to another cluster in the magnetic disk device, the file management system of the host apparatus recognizes the destination cluster as the storage location of the data.

In Japanese Patent Laid-open No. 10-301721, a technique is disclosed which concerns how to reallocate sectors in order to solve the problem that the transfer rate would deteriorate as a consequence of using alternate sectors prepared for defective sectors. User data are rewritten in an alternate region and the allocation of LBAs to sectors is renewed by skipping the primary and secondary defective sectors. Then, the user data including those recorded in a save region are recorded in the sectors which are given new LBAs. Since the sectors given new LBAs do not use any sectors in the save region, the data access time can be reduced. In this case, the file management system of the host apparatus does not recognize that the storage locations of the data are changed. Changing the LBAs of sectors and moving data are implemented only by changing a reallocation defect map in the magnetic device.

BRIEF SUMMARY OF THE INVENTION

However, data transfer/swap between clusters is inevitable in the process of carrying out defragmentation. If defragmentation involves the host apparatus's operation to read data into the memory from the storage device, time is spent for data transmission between the host apparatus and the storage device. This increases the time spent for defragmentation and consumes the memory and communication path resources of the host apparatus. As the amount of data on a recording medium increases, defragmenting the recording medium requires a huge amount of time. Expectation is rising for a high-speed defragmentation method.

In particular in such storage apparatus as hard disk recorders and MP3 recorder/player units which record voice and/or image information in their storage devices, such a huge number of fragments may occur as to make defragmentation difficult. For example, in the case of a hard disk recorder to record television programs, the user will delete programs he is not interested in when the magnetic disk is filled with video data. The deleted programs are not always the oldest ones. Further, since each program has a different length in time, it may be difficult to record a new program in contiguous addresses. In addition, some hard disk recorders are provided with a capability automatically to not only delete programs considered not interesting for the user but also record programs considered interesting for the user. In such a hard disk driver, a huge number of fragments occur since erase and write are performed more frequently than in personal computers. Meanwhile, if defragmentation is entirely performed by the storage device side, the data expected by the host apparatus may become inconsistent with the data recognized by the storage device in case the defragmentation is interrupted due to a power failure or some other disturbance. In this case, the host apparatus cannot access data it requires. Accordingly, sufficient consistency must be secured in data identification between the host apparatus and the storage device even if defragmentation is interrupted in the process of moving data to another storage location.

It is therefore a feature of the present invention to provide a high-speed method for transferring or swapping data stored in data blocks and updating the file management system of an host apparatus in randomly accessible storage devices such as magnetic disk drives, magnetic optical disk drives, PC card semiconductor memories and CF card semiconductor memories, without imposing a large burden on the host apparatus. In addition, it is another feature of the present invention to provide a high-speed method for defragmenting a randomly accessible storage device without imposing a large burden on the host apparatus. Further, it is another feature of the present invention to provide a storage device which implements such a method.

According to specific embodiments of the present invention, a host apparatus sends to a rotary disk type storage device a command to transfer or swap stored information between data blocks in a rotary disk type storage device for the purpose of defragmentation or the like. After the command is received, the storage device transfers or swap the information between the data blocks without data transmission to and from the host apparatus. Consistency in stored information identification is maintained between the host apparatus and the storage device even if the operation is interrupted.

According to a first aspect of the present invention, there is provided a method for transferring information stored in a source data block to a destination data block in a storage device which has a recording medium containing source data blocks, destination data blocks and dummy blocks and is capable of communicating with a host apparatus. The method comprises receiving a transfer command from the host apparatus; copying information stored in a destination data block to a dummy block; in a mapping table to map the data blocks to the dummy blocks, writing an entry which maps the destination data block to the dummy block; copying information stored in a source data block to the destination block; erasing the entry from the mapping table; and sending a transfer completion command to the host apparatus.

It is not necessary to physically integrate the host apparatus with the storage device if they can communicate with each other. Each data block may be either a sector or plural sectors. The transfer command may include a command that urges the storage device to activate a program concerning the present embodiment. The mapping table may be a relocation defect map by which secondary defective sectors are mapped to alternate sectors. Preferably in particular, the storage device is a rotary disk type storage device employing a rotary disk type recording medium as the recording medium containing source data blocks, destination data blocks and dummy blocks since data consistency can be maintained between the host apparatus and the storage device even if a power failure occurs between data transfers. This is because a rotary disk type storage device spends more time to transfer data between data blocks on the rotary medium than semiconductor memories and therefore is less likely to be affected by power failure.

According to a second aspect of the present invention, there is provided a method for swapping information stored in a first data block with information stored in a second data block in a storage device which has a recording medium containing first data blocks, second data blocks, first dummy blocks and second dummy blocks and is capable of communicating with a host apparatus. The method comprises receiving a swap command from the host apparatus; copying information stored in a first data block to a first dummy block; copying information stored in a second data block to a second dummy block; in a mapping table to map the data blocks to the dummy blocks, writing entries by which the first data block is mapped to the first dummy block and the second data block is mapped to the second dummy block; copying the information stored in the first dummy block to the second data block; copying the information stored in the second dummy block to the first data block; erasing the entries from the mapping table; and sending a swap completion command to the host apparatus.

According to the first and second aspects, it is possible to constitute a defragmentation method for the host apparatus. According to a third aspect of the present invention, there is provided a storage device which implement the first and second aspects. The host apparatus may also be either a hard disk recorder or an MP3 recorder/player. A first recording medium to store data blocks, etc., a second recording medium to store a mapping table and a third recording medium to store a program to be executed by a processor may be one and the same recording medium, such as a rotary disk type recording medium, a semiconductor memory or the like.

The present invention can provide a high-speed method for transferring or swapping data stored in data blocks and updating the file management system of a host apparatus in randomly accessible storage devices such as magnetic disk devices, magnetic optical disk devices, PC card semiconductor memories and CF card semiconductor memories, without imposing a large burden on the host apparatus. In addition, the present invention can provide a high-speed method for defragmenting a randomly accessible storage device without imposing a large burden on the host apparatus. Further the present invention can provide a storage device which implements such a method.

DETAILED DESCRIPTION OF THE INVENTION

Figure 1:
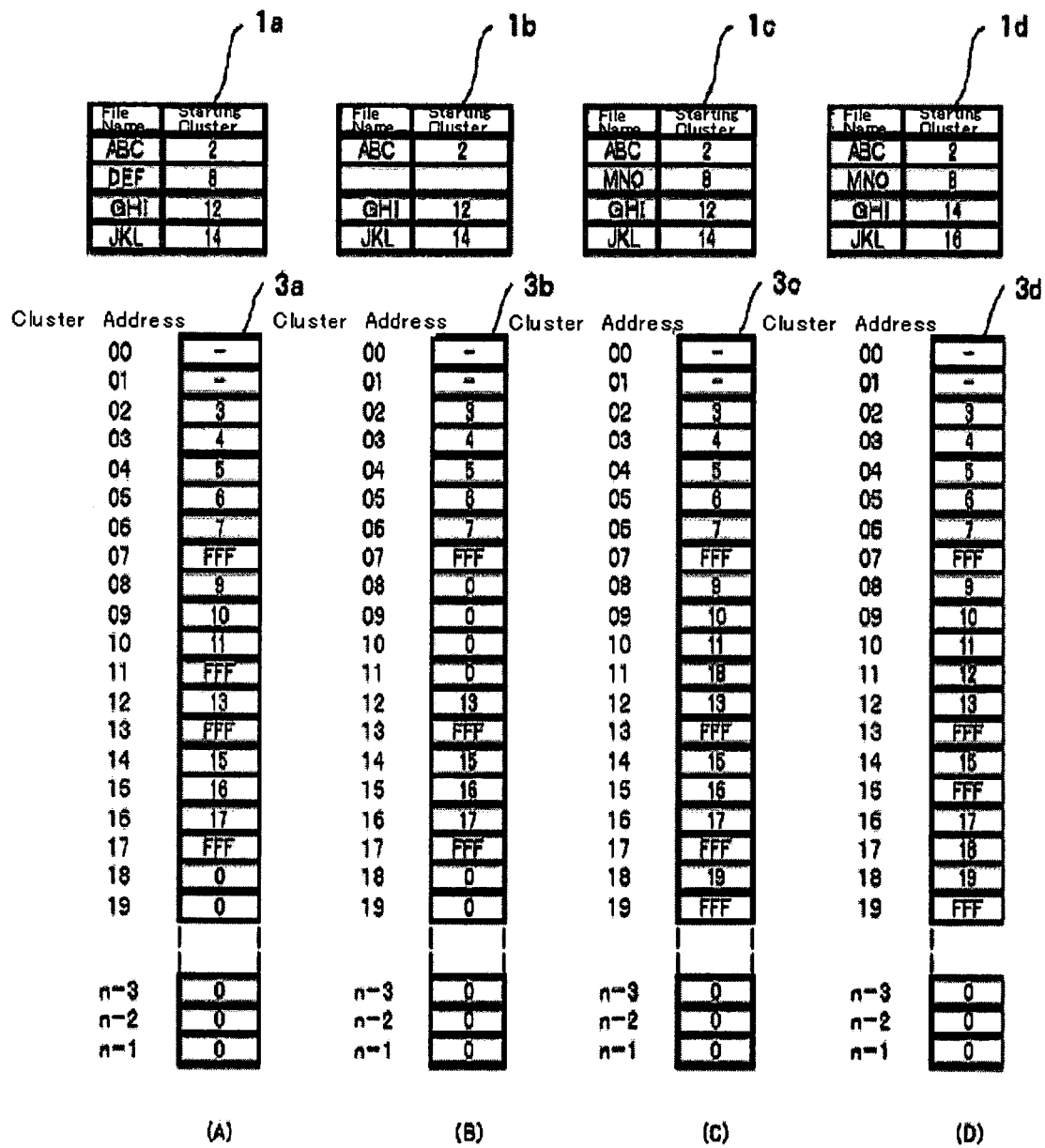
FIG. 1 is a schematic diagram for explaining how defragmentation is done by a host apparatus for a magnetic disk drive according to an embodiment of the present invention.

Outline of Defragmentation Done by Host Apparatus

With reference to FIGS. 1A to 1D, the following provides a general description of how a host apparatus performs defragmentation with a magnetic disk drive in accordance with an embodiment of the present invention. Host apparatus, such as personal computers and hard disk recorders, are provided with file management systems for magnetic disk drives. They manage files by use of, for example, management tables 1a through 1d and management tables 3a through 3d. Throughout this specification, a file refers to information stored on a magnetic disk, which may contain any of user data, system data, firmware and programs concerning the operation of the magnetic disk drives, identifiers and adjustment parameters for the magnetic disk drive, and so on.

Management tables 1a through 1d and management tables 3a through 3d are stored in a system area on the magnetic disk. They are read into a memory from the magnetic disk drive when the host apparatus is operating. Each entry in management tables 1a through 1d has the name of the file and the address of its starting cluster. Further, management tables 1a through 1d store the extension, attribute, write date/time, size, etc. of each file as the case may be. Entries in management tables 3a through 3d have the addressees of the subsequent clusters of the corresponding file whose starting cluster address is stored in management tables 1a through 1d. Management tables 3a through 3d indicate that the magnetic disk drive has a total of n clusters.

Management table 1a and management table 3a in FIG. 1A indicate that four files ABC, DEF, GHI and JKL are stored in the magnetic disk drive. Management table 1a stores 2 (file ABC), 8 (file DEF), 12 (file GHI) and 14 (JKL) as the respective addresses of the four files' starting clusters. In each cluster, a plurality of sectors are arranged in LBA order. It is possible to point the start address of each cluster by the LBA of its first sector among the plurality of sectors. Focusing on file ABC, management table 3a is to be examined. In the entry for cluster address 2, 3 is stored as the address of the next cluster. In the cluster address 3 entry, 4 is stored as the address of the third cluster. The subsequent consecutive cluster addresses stored indicate that the information constituting file ABC is stored sequentially in six clusters whose cluster addresses are 2, 3, 4, 5, 6 and 7. Note that FFF in a management table 3a entry means the file terminates there.

Likewise, file DEF is stored sequentially in four clusters whose cluster addresses are 8, 9, 10 and 11, file GHI is in two clusters with cluster addresses 12 and 13, and file JKL in four clusters with cluster addresses 14, 15, 16 and 17. Note that 0 appears in the entries for cluster addresses 18, 19, n-3, n-2 and n-1. Numeral 0 means the cluster is not used. Also note that symbol "-" appears in the entries for cluster address 0 and 1. Symbol "-" means the cluster is not to be used by the user. In FIG. 1A, four files are all sequentially stored in consecutive clusters, and no fragmentation has occurred. The meanings of FFF, "-" and 0 in entries are common to management tables 3a through 3d.

FIG. 1B indicates that the host apparatus has deleted file DEF from the magnetic disk. File DEF and its starting cluster's address are withdrawn from the management table 1b entry. In management table 3b, the entries for cluster addresses 8, 9, 10 and 11 are rewritten to 0s which make these clusters free. FIG. 1C indicates that file MNO using six clusters are written on the magnetic disk whose previous storage condition was as indicated by FIG. 1B. When writing a new file, the file management system of the OS refers to management table 3a, 3b, 3c or 3d for free clusters in order to write the file sequentially in free clusters. In the case of FIG. 1B, since four clusters with cluster addresses 8, 9, 10 and 11 are free, the information constituting file MNO is written sequentially therein at first. However, since two more clusters cannot be obtained as a contiguous area, the remaining information is written in cluster 18 and cluster 19. Therefore, file MNO is written in cluster addresses 8, 9, 10, 11, 18 and 19. Since cluster address 11 is apart from cluster address 18 with other clusters between them, fragmentation has occurred.

When reading file MNO in response to a read command from the host apparatus, the head of the magnetic disk drive can sequentially access the magnetic disk between cluster address 8 and cluster address 11 in track order and in sector order during rotation of the disk. To access cluster address 18 after cluster address 11 is accessed, however, seek operation time and rotary latency may occur. FIG. 1D indicates that fragmentation is cleared up by defragmenting the magnetic disk drive whose storage condition was as indicated in FIG. 1C. This requires rewriting of information stored in cluster address 11 and subsequent clusters.

Information having been stored in cluster address 18 is written into cluster address 12 so that the information having been stored in cluster address 18 comes after cluster address 11. Likewise, information having been stored in cluster address 19 is written into cluster address 13. Consistently, the entries for cluster addresses 11 and 12 in management table 3 are respectively changed to 12 and 13. Further, the entry for cluster address 13 is changed to FFF. Likewise, information constituting file GHI and information constituting file JKL are rewritten in other cluster addresses as shown in FIG. 1D.

FIG. 1D shows the result of the defragmentation. In management table 1d, the start address of the file GHI is changed to 14 and the start address of the file JKL is changed to 16. Further, in management table 3d, the entry for cluster address 11 and the subsequent entries are all changed to new cluster addresses. Thus, even after the defragmentation is made through reallocation of storage information to clusters, the file management system of the OS can accurately access the magnetic disk by using the management table 1d and management table 3d.

As apparent from management table 3d in FIG. 1(D), fragmentation is cleared up since the information constituting files MNO, GHI, JKL is all written sequentially in contiguous cluster addresses. When transferring information from a cluster to another cluster for defragmentation, the OS preliminarily saves information in the destination cluster to a separate area so as not to lose the information. Alternatively, the transfer sequence is determined by the OS so that information is always transferred to free sectors. That is, defragmentation involves the task of transferring information actually stored in clusters on the magnetic disk to other clusters as well as the task of updating the management table under management of the file management system of the OS.

Configuration of Magnetic Disk Drive

Figure 2:
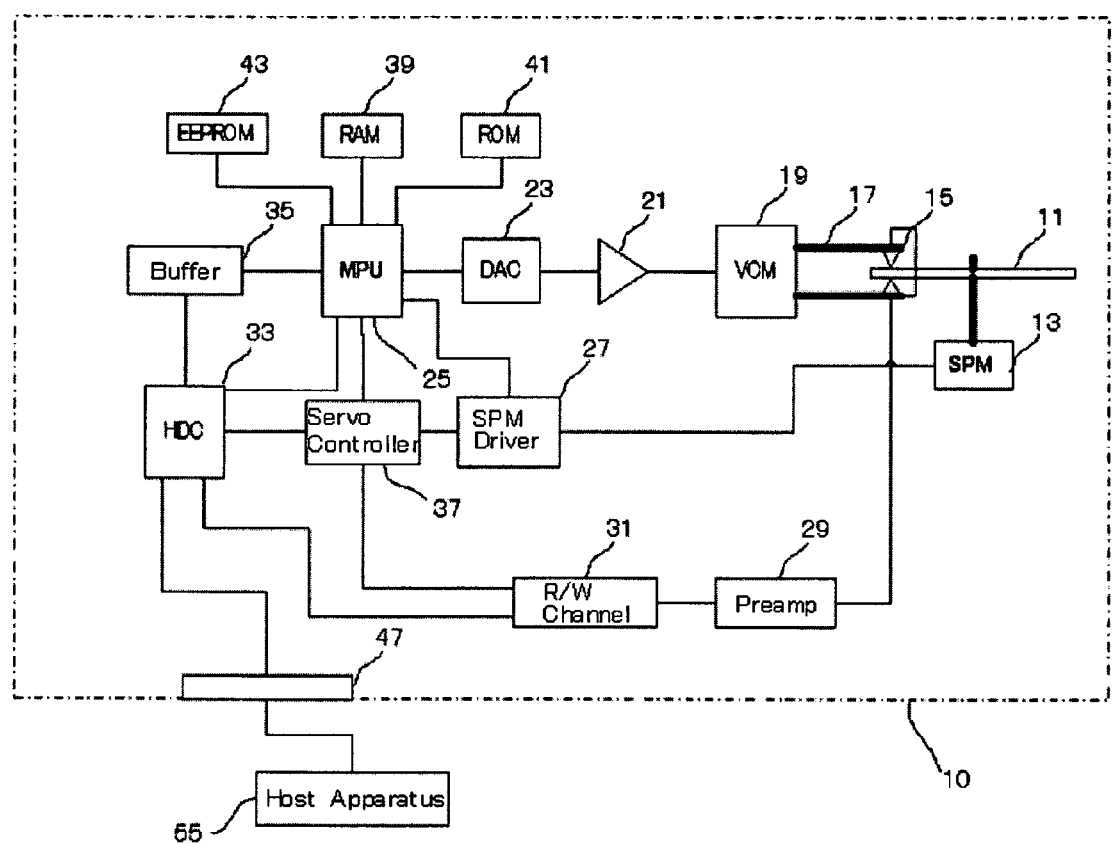
FIG. 2 is a schematic diagram for explaining the configuration of a magnetic disk device 10 according to an embodiment of the present invention.

With reference to FIG. 2, the following describes the general configuration of a magnetic disk drive 10 according to an embodiment of the present invention. Throughout this specification, identical elements are designated by the same reference numeral. Reference numeral 11 denotes one or more stacked magnetic disks mounted on a spindle hub as a recording medium, with each disk having a recording surface comprising a magnetic layer on each side. The disks are rotated by a spindle motor 13. A plurality of tracks are concentrically formed on each recording surface of each magnetic disk 11. In the circular direction, each track has a plurality of 512-byte sectors or data blocks. The sector is the smallest unit for data read/write. In the magnetic disk drive 10, the position of each sector is recognized by the CHS parameter in order to locate each head 15 at a desired sector. On the other hand, when a host apparatus 55 specifies a file storage location to the magnetic disk drive 10, it sends the LBAs of sectors or the addresses of clusters each defined as a collection of sectors.

Figure 3:
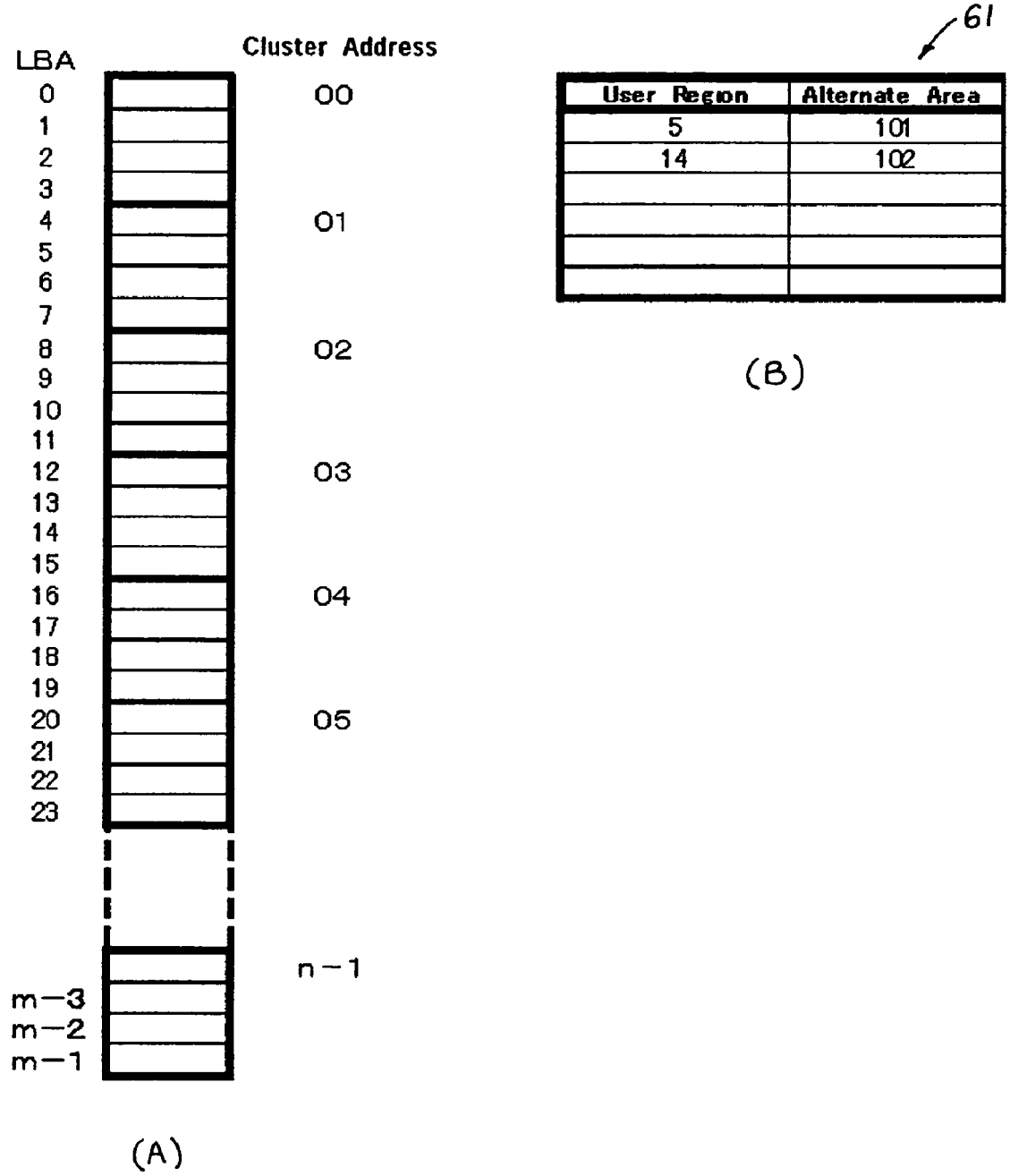
FIG. 3 is a diagram for explaining how sectors and clusters are organized on a magnetic disk.

With reference to FIG. 3 (which includes FIGS. 3A and 3B), the following describes how sectors and clusters are organized on the magnetic disks 11. It is assumed that the magnetic disks 11 are a plurality of stacked disks each of which has a recording surface on each side. LBA 0 is allocated to one sector in the outermost track on the top side of the first magnetic disk. Then, LBA1, LBA2 and subsequent consecutive numbers are respectively allocated to the remaining sectors in the order of appearance in the rotary direction. Then, the subsequent ascending numbers are respectively allocated to all sectors existing in the second outermost track. Such allocation is repeated for the bottom side of the first magnetic disk, the top side of the second magnetic disk, and the bottom side of the second magnetic disk. Thus, all sectors on all surfaces of all magnetic disks are respectively given consecutive numbers. The resulting condition is shown in FIG. 3A. Note that the number of sectors sometimes differs from the number of LBAs since LBAs are allocated to only available sectors. Primary defective sectors detected by inspection during manufacture process are skipped when LBAs are allocated to sectors. In addition, the magnetic disks 11 are divided into a user region and a system region. The user region is composed of user sectors which are used by the user to store data and programs whereas the system region is composed of sectors used to store data and programs which are used by a system for the magnetic disk drive 10. These regions are managed by the magnetic disk drive.

The magnetic disks 11 have a total of m sectors in the user and system regions. LBAs are respectively allocated to these sectors in serial order. In this embodiment, a set of four sectors is defined as a cluster by the host apparatus 55 and the magnetic disk drive 10 allocates one cluster address to each set of four sectors and has a total of n cluster addresses. The cluster size is determined freely by the host apparatus 55. If a secondary defect occurs in some user sector after the magnetic disk drive 10 begins to be used, the data in the defective user sector is written into an alternate area which is prepared in the system region. To associate the LBAs of such user sectors with the LBAs of their alternate sectors in the alternate area, a relocation defect map (hereinafter denoted as RDM) 61 is provided (refer to FIG. 3B).

The RDM 61 is stored in a non-volatile recording medium EEPROM 43. When the magnetic disk drive 10 is started, the RDM 61 is read into a RAM 39. Each time an entry is updated, write is done to the EEPROM 43. Alternatively, the RDM 61 may be stored in the system region of the magnetic disks 11. If the LBA of a defective sector is designated by the host apparatus 55, the RDM 61 is used to access its alternate sector. Reallocation of defective sectors is done internally in the magnetic disk drive 10. When a defective sector is reallocated, the file management system of the host apparatus 55 does not recognize the LBA of the alternate sector, but the host apparatus 55 continues to recognize the LBA of the defective sector.

FIG. 3A indicates that the magnetic disks 11 have secondary defects in the user sectors LBA5 and LBA14. In the RDM 61, entries are made to associate user sectors LBA5 and LBA14 respectively with alternate sectors LBA101 and LBA102. Thus, sector LBA5 is mapped to sector LBA101 whereas sector LBA14 is to LBA102. Alternate sectors LBA101 and LBA102 are sectors prepared in the system region. When the host apparatus 55 accesses the magnetic disk drive 10 in order to read some file, it designates a cluster address. The magnetic disk drive 101 refers to the RDM 61 while accessing the sectors in the designated cluster address in the ascending order of LBA. If a defective sector is found in the cluster, access is moved to its alternate sector to read information therefrom and send it to the host apparatus.

The head 15 comprises two independent transducers or a common transducer to perform write and read to and from the magnetic disk 11 by converting an electric signal to a magnetic signal and vice versa. An actuator assembly 17, which bears the head 15, pivots to move the head 15 onto a desired track on the magnetic disk 11. A voice coil motor (hereinafter denoted as VCM) 19 is composed of a voice coil mounted on the actuator assembly 17 and a voice coil magnet and voice coil yoke attached to the base of the magnetic disk drive 10. The operation of the actuator assembly 17 is controlled by the electric current passing through the voice coil. A VCM driver 21 receives a voltage signal from a digital analog converter (hereinafter denoted as DAC) 23 and converts it to an electric current which drives the VCM 19. The DAC 23 receives a digital signal for positioning the head 15 from a microprocessing unit (hereinafter denoted as MPU) 25 and converts it to an analog voltage signal.

A spindle motor driver 27, provided with an AD converter, receives a digital signal from the MPU 25 and converts it to a current which drives a spindle motor 13. During read operation, a preamp 29 amplifies a weak analog readout signal retrieved by the head 15 from a magnetic disk 11 and sends the amplified signal to a read/write channel (hereinafter denoted as R/W channel) 31. During write operation, the preamp 29 amplifies an analog write signal received from the R/W channel 31. The amplified signal is output to the head 15.

The R/W channel 31 performs data processing for reading or writing data. Digital write data sent from the host apparatus 55 is received by the R/W channel 31 via a hard disk controller (hereinafter denoted as HDC) 33. The R/W channel 31 converts the received digital data to a write current and sends it to the preamp 29. Further, a readout signal from the head 15 is converted by the R/W channel 31 to digital data. The R/W channel 31 sends the digital data to the host apparatus 55 via the HDC 33. A servo controller 37 extracts head position information from the readout data output by the R/W channel 31 and sends the information to the MPU 25 and the HDC 33.

Functioning as an interface to communicate with the host apparatus 55, the HDC 33 provides coordination between the data transfer rate of the host apparatus 55 and the internal data processing rate of the magnetic disk drive 10. The HDC 33 allows data transferred from the host apparatus 55 to be temporally stored in a buffer 35 and, based on a command from the MPU 25, sends it to the R/W channel 31. In addition, the HDC 33 allows data transferred from the R/W channel 31 to be temporally stored in the buffer 35 and, based on a command from the MPU 25, sends it to the host apparatus 55. Further, the HDC 33 is provided with a data error correcting circuit, address mark detecting circuit and the like. The HDC 33 also has a register allowing data communication with the host apparatus 55.

In cooperation with the HDC 33, the MPU 25 performs general control of the magnetic disk drive 10. The MPU executes a defragmentation-executing program according to the embodiment of the present invention. Interpreting a command sent from the host apparatus 55, the MPU 25 transfers or swaps information between sectors or clusters. Upon completion of a data transfer or swap, the MPU 25 sends a completion command to the host apparatus 55. The MPU 25 directly accesses various registers in the HDC 33 to control data transfers to and from the host apparatus 55. Cluster addresses on the magnetic disks 11, sent from the host apparatus 55, are converted the to LBAs and further to CHS parameters by the MPU 25. With reference to the RDM 61, the MPU 25 also calculates the addresses of alternate sectors that are associated with secondary defective sectors. In addition, the MPU 25 recognizes the position of the magnetic head 15 based on servo information sent from the servo controller 37 and sends to a digital analog converter (hereinafter denoted as DAC) 23 a digital signal used to move the head 15 to a target position. This digital signal is generated based on the difference between the current position and the target position calculated from the address designated by the host apparatus 55.

A read only semiconductor memory (hereinafter denoted as ROM) 41 stores a defragmentation-executing program, which is executed by the MPU 25 to implement defragmentation in accordance with the embodiment of the present invention. Alternatively, the defragmentation-executing program may be stored in the system region of the magnetic disks 11. A random access memory (hereinafter denoted as RAM) 39 is a main memory unit used to temporally store various programs to be executed by the MPU 25. The RAM 39 is also used as working storage of the MPU 25. While the magnetic disk drive is operating, the cluster address to CHS parameter conversion table and the RDM 61 are held in the RAM 39 as well.

An electrically rewritable non-volatile recording medium (hereinafter denoted as EEPROM (Electrically Erasable Programmable Read-Only Memory) 43 stores information specific to the magnetic disk drive 10, such as the model name, serial number, firmware version, protocol to be used and manufacture's name, and information concerning settings for power management, write caching, look-ahead caching, write buffering and so on. The EEPROM 43 stores the RDM 61 where entries are made to map secondary defective sectors to alternate sectors. Further, while the magnetic disk drive 10 is operating, the EEPROM 43 keeps an error log, event log, performance data log, servo log, host log, etc.

The host apparatus 55 is an electronic apparatus which uses the magnetic disk drive 10 as an external storage device or an auxiliary storage device. Connected to an interface connector 47, it performs data transfer with the magnetic disk drive 10 according to such an interface protocol as the ATA (AT Attachment) or SCSI (Small Computer System Interface) standard. In this embodiment, the magnetic disk drive 10 employs the ATA interface standard. In addition, the host apparatus 55 examines how the magnetic disk drive 10 is fragmented, generates a scheme for reallocation of information stored in user sectors or clusters and decides to transfer/swap stored information between sectors or clusters in order to carry out defragmentation.

The magnetic disk drive 10 according to the embodiment of the present invention has so far been described with reference to its block diagram. Note that the name and function of each block, block-to-block interrelations and others are examples. The approach of the present invention is not limited to this embodiment. The scope of the present invention covers all modifications, such as adding a function, modifying a block without changing its function, dividing a block and integrating blocks, which can be made to this embodiment by those skilled in the art by referring to this specification.

Method for Transferring Data Stored in Cluster

Figure 4:
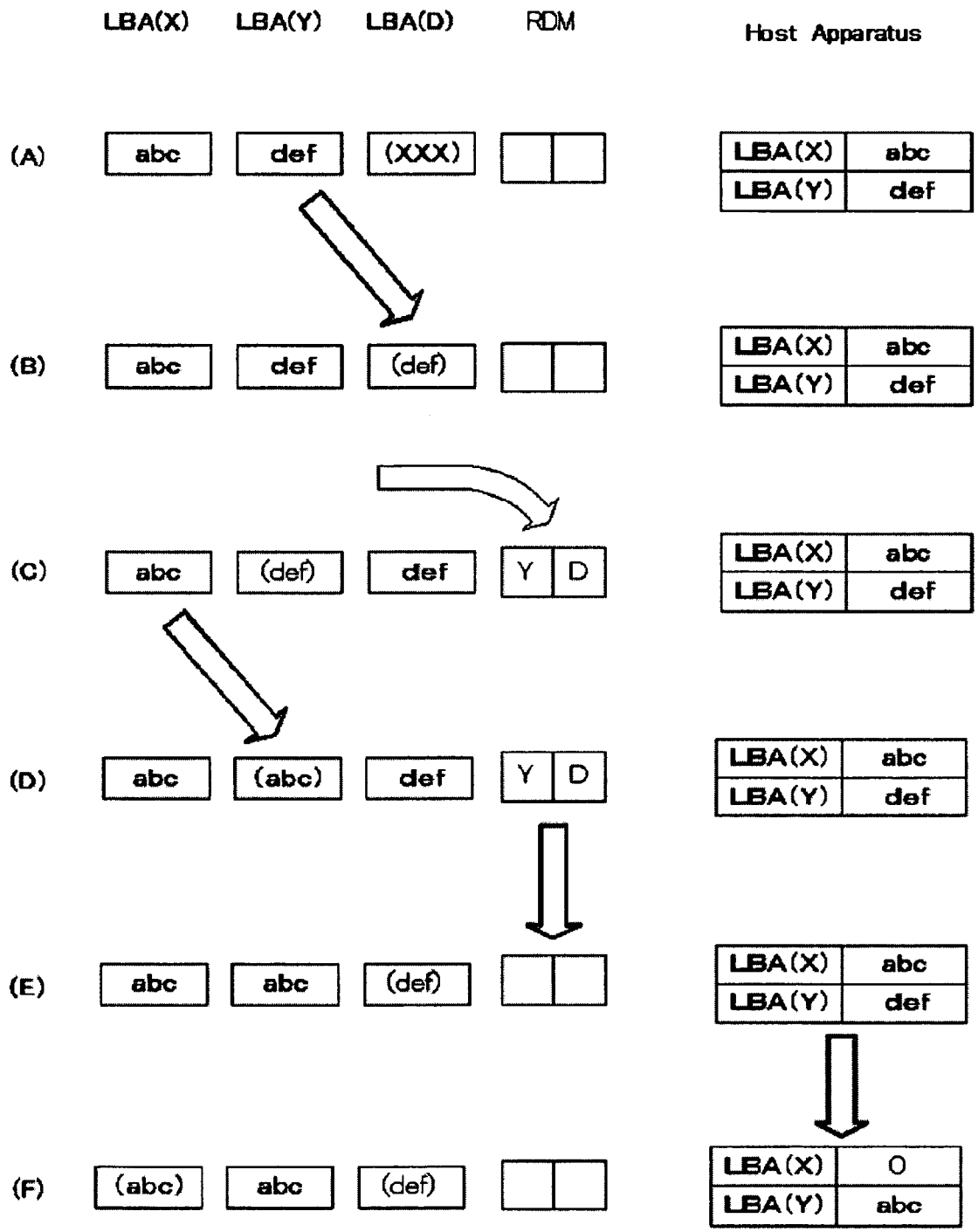
FIG. 4 is a diagram for explaining a method for transferring stored data between clusters in a magnetic disk drive.
Figure 5:
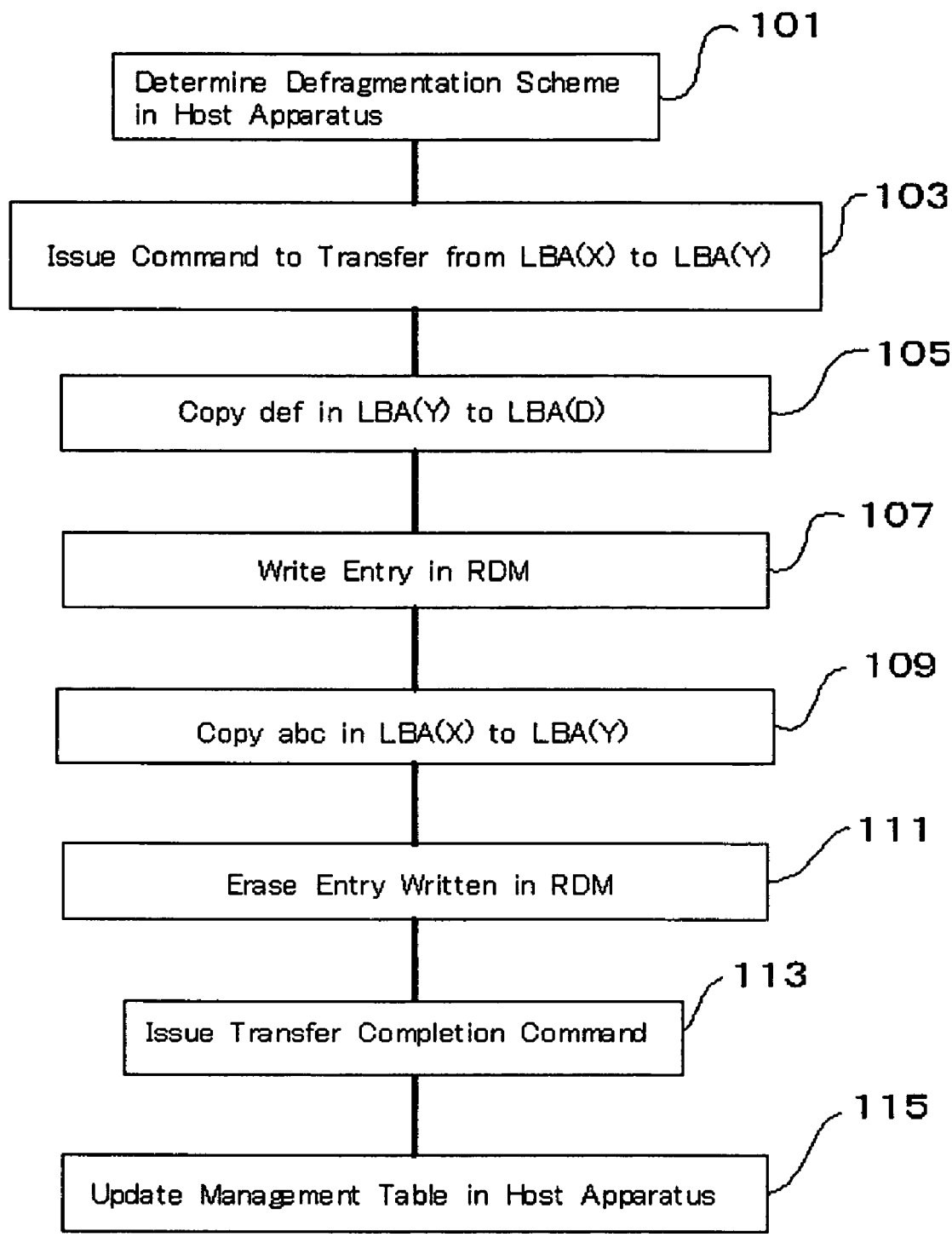
FIG. 5 is a flowchart for explaining a method for transferring stored data between clusters in a magnetic disk drive.

The following describes a method for transferring stored information between clusters in the magnetic disk drive 10 with reference to FIGS. 4 and 5. It is assumed that the host apparatus 55 has already checked how files are stored on the magnetic disks 11 and, based on the recognized fragmentation, prepared a stored information transfer procedure for defragmentation. For example, in FIG. 1C, since file MNO is stored sequentially in clusters 8, 9, 10, 11, 18 and 19 in this order, information stored in clusters 18 and 19 must be moved to clusters 12 and 13. For this purpose, clusters 12 and 13 must be changed to free clusters in advance by transferring information stored in clusters 12 and 13 to other clusters that are unused.

To transfer data in either cluster 12 or cluster 13, data in the sectors contained in the cluster must be transferred. Therefore, data transfer between clusters in the magnetic disk drive 10 is described in a generalized manner by assuming that data in user sector LBA(X) is to be transferred to user sector LBA(Y) as shown in FIGS. 4 and 5. Here in this specification, a data transfer means that data stored in a source user sector is stored in a destination user sector. It does not matter whether after the data transfer, the host apparatus considers that the transferred data remains stored in the source user sector or that the source user sector is an unused user sector.

An unused sector or cluster means a sector or cluster considered by the file management system of the host apparatus as a sector or cluster in which no data is stored regardless of whether data is actually stored therein or not. Each cluster is a set of plural sectors. It is possible to designate a specific cluster by specifying the LBA of its first sector and the number of sectors constituting the cluster. Therefore, although this specification describes how data recorded in a sector is transferred, this leads to understanding of how data recorded in a cluster is transferred.

FIG. 4 provides a time-series description of how data abc recorded in user sector LBA(X) is transferred to user sector LBA(Y). FIG. 5 is a flowchart for explaining how data is transferred from user sector LBA(X) to user sector LBA(Y). In block 101, the host apparatus 55 uses a widely known technique to check the state of fragmentation by scanning the sectors on a magnetic disk 11 and formulates a cluster-to-cluster data reallocating scheme for defragmentation.

Before data transfer, data abc is stored in user sector LBA(X) whereas data def is stored in user sector LBA(Y) as shown in FIG. 4A. It does not matter to assume user sector LBA(Y) as an unused sector. Dummy sector LBA(D) is a sector prepared in the system region on the magnetic disk 11 and used as a temporary data store place when data is transferred from user sector LBA(X) to user sector LBA(Y).

Dummy sector LBA(D) performs the same function as alternate sectors LBA101 and LBA102 described with FIG. 3. Either user sector LBA(X) or user sector LBA(Y) can be accessed if an entry is made in the RDM to map the user sector to dummy sector LBA(D). Here, mapping means associating the address of a sector with the address of another sector so that for example, when the MPU 25 intends to access LBA(X), dummy sector LBA(D) is accessed.

Dummy sector LBA(D) is a sector that is recognized and accessed only by the system of the magnetic disk apparatus 10. This sector is not recognized by the host apparatus and cannot directly be accessed by the user. The RDM in FIG. 4 corresponds to the RDM 61 described with FIG. 3. Entries stored in the RDM can be updated. To simplify the description, entries in the RDM which are made to map the LBAs of secondary defective sectors are omitted from FIG. 4.

Through the cluster address in management tables 1 and 3 shown in FIG. 1, the file management system of the host apparatus 55 recognizes that data abc is stored in user sector LBA(X) and data def is stored in user sector LBA(Y). Therefore, if the host apparatus 55 sends to the magnetic disk drive 10 a command to read data from user sector LBA(X), the data the host apparatus 55 intends to read can be read out consistently. In FIG. 4A, since none is written in the RDM, the MPU 25 which has received the read command does not access the dummy sector LBA(D) although it refers to the RDM. Accordingly, even if some data XXX is stored in dummy sector LBA(D), the MPU 25 does not read data XXX from dummy sector LBA(D). Before sending a data transfer command, the host apparatus 55 sends a command to urge the MPU 25 to activate the defragmentation executing program so as to create an environment in which the magnetic disk drive 10 can perform a data transfer in accordance with the present embodiment. Alternatively, the defragmentation executing program activation command may be included in the data transfer command.

In block 103, the host apparatus 55 sends to the magnetic disk drive 10 a command to transfer data abc in user sector LBA(X) to user sector LBA(Y). In the magnetic disk drive 10, the defragmentation executing program stored in the ROM 41 is executed by the MPU 25 to perform the data transfer. In block 105, the MPU 25 copies data def in the data destination user sector LBA(Y) to dummy sector LBA(D). Since no entry is written in the RDM, however, the MPU 25 does not access dummy sector LBA(D). In block 107, the MPU 25 writes an entry in the RDM to map user sector LBA(Y) to dummy sector LBA(D) as shown in FIG. 4C.

It is designed that the MPU 25 refers to the RDM whenever it calculates CHS parameters from a sector LBA specified by the host apparatus 55. Therefore, if it is instructed by the host apparatus 55 to access user sector LBA(Y) after the entry is written in block 107, the MPU 25 will access dummy sector LBA(D). Accordingly, the MPU 25 will not access user sector LBA(Y) although data def remains stored in this sector.

In block 109, data abc in user sector LBA(X) is copied to user sector LBA(Y) as shown in FIG. 4D. If the host apparatus 55 sends a command to access user sector LBA(Y), the MPU 25 accesses dummy sector LBA(D) since user sector LBA(Y) is mapped to dummy sector LBA(D) by the RDM entry. Thus, the data the host apparatus 55 expects in LBA(Y) is consistently recognized in the magnetic disk drive 10.

In block 111, the entry written in the RDM to map user sector LBA(Y) to dummy sector LBA(D) is erased. If the MPU 25 is instructed by the host apparatus 55 to access user sector LBA(Y) after the written entry is erased in block 111, user sector LBA(Y) will be accessed. At this point, since the host apparatus 55 considers yet that data def is stored in user sector LBA(B), the data the host apparatus 55 expects is not consistently recognized in the magnetic disk drive 10.

In block 113, the MPU 25 sends a data transfer completion command to the host apparatus 55. In block 115, the host apparatus 55 updates the management table entries according to the command so that user sector LBA(X) is recognized as an unused sector and data abc is recognized as stored in user sector LBA(Y). This makes again what are recognized by the host apparatus 55 consistent with what are recognized by the magnetic disk drive 10. Since block 111 through block 115 are completed in a relatively short time, the possibility that the defragmentation operation may interrupt without maintaining the data consistency between the host apparatus 55 and the magnetic disk drive 10 is low, causing no trouble substantially at all.

Updating of the management table entries by the file management system of the host apparatus 55 in block 115 may be modified such that the original data abc is recognized as yet stored in user sector LBA(X). This corresponds to copying data to user sector LBA(Y) from user sector LBA (X).

Then, assume that the transfer operation or defragmentation interrupts due to a power failure or some other reason before management table entries are updated in block 115 by the host apparatus 55 in response to a command transfer completion command received from the magnetic disk drive 10 after the transmission of a transmission command from the host apparatus 55 to the magnetic disk drive 10 in block 103. According to the present embodiment, data consistency between the host apparatus 55 and the magnetic disk drive 10 can be maintained even in this case as described below.

If the operation interrupts while data def in user sector LBA(Y) is being copied to dummy sector LBA(D) in block 105, it is possible that data def could not correctly be copied to dummy sector LBA. However, the corresponding entry is not yet written in the RDM when the defragmentation is terminated. If a command to access user sector LBA(Y) is received by the MPU 25 from the host apparatus 55, the MPU 25 will access user sector LBA(Y). Thus, data consistency can be maintained between the magnetic disk drive 10 and the host apparatus 55.

Assume that interruption occurs while an entry to map user sector LBA(Y) to dummy sector LBA(D) is being written in the RDM in block 107. Data consistency is maintained between the host apparatus 55 and the magnetic disk drive 10 if writing the entry is either not started or completed since user sector LBA(Y) will be accessed in the former case while dummy sector LBA(D) will be accessed in the latter case. The amount of data written per entry in the RDM is very small and the EEPROM 43 allows high-speed write. Therefore, the possibility of causing such a write error as to map user sector LBA(Y) to some address other than dummy sector LBA(D) is very small. Furthermore, the RDM is typically duplicated and checked upon power on. If an error occurs while an entry is being written to a RDM, another RDM will be used. If the entry is judged as written properly, that RDM will be used. Thus, such a problem as mentioned above does not occur.

Assume that interruption occurs while data abc in user sector LBA(X) is being copied to user sector LBA(Y) in block 109. In this case, there is the possibility that data abc could not correctly be copied to user sector LBA(Y). At this time, however, if a command to access user sector LBA(Y) is received by the MPU 25 from the host apparatus 55, the MPU 25 access dummy sector LBA(D) since the entry to map user sector LBA(Y) to dummy sector LBA(D) is written. Therefore, the data the host apparatus 55 expects is consistently recognized by the magnetic disk drive 10. Thus, data consistency is maintained. As for interruption between block 111 and block 115, the corresponding description above is applicable.

In the present embodiment, as mentioned so far, a command to transfer data between sectors or clusters can be executed within the magnetic disk drive after it is received from the host apparatus. Therefore transmitting data to and from the host apparatus 55 and receiving a plurality of commands from the host apparatus 55 are not necessary. This allows data transfers to be executed at high-speed while reducing the burden on the host apparatus. In particular, in an environment where the host apparatus is connected to a plurality of magnetic disk drives by using a SCSI, fiber channel or some other data bus, execution of data transfers can remarkably be improved in quickness since the reduced amounts of data transmitted between the host apparatus and the magnetic disk drives allow data transfers to be executed without waiting for available time slots of the data bus. In addition, since the host apparatus enables the magnetic disk drive to transfer data only by sending one command thereto, a burden on the host apparatus can be reduced more than before. Use of the data transfer method according to the present embodiment is not limited to defragmentation. Rather, this transfer method can be used as a general method for transferring data between sectors or clusters in a magnetic disk drive while maintaining data consistency between the host apparatus and the magnetic disk drive by reflecting the result to the management table of the file management system. In other words, this file transfer method can be used as a method which, not as disclosed in Japanese Patent Laid-Open No. 10-301721, does not require reallocation of LBAs to sectors in order to maintain data consistency between the host apparatus and the magnetic disk after data is moved.

Method for Swapping Data Stored in Clusters

Figure 6:
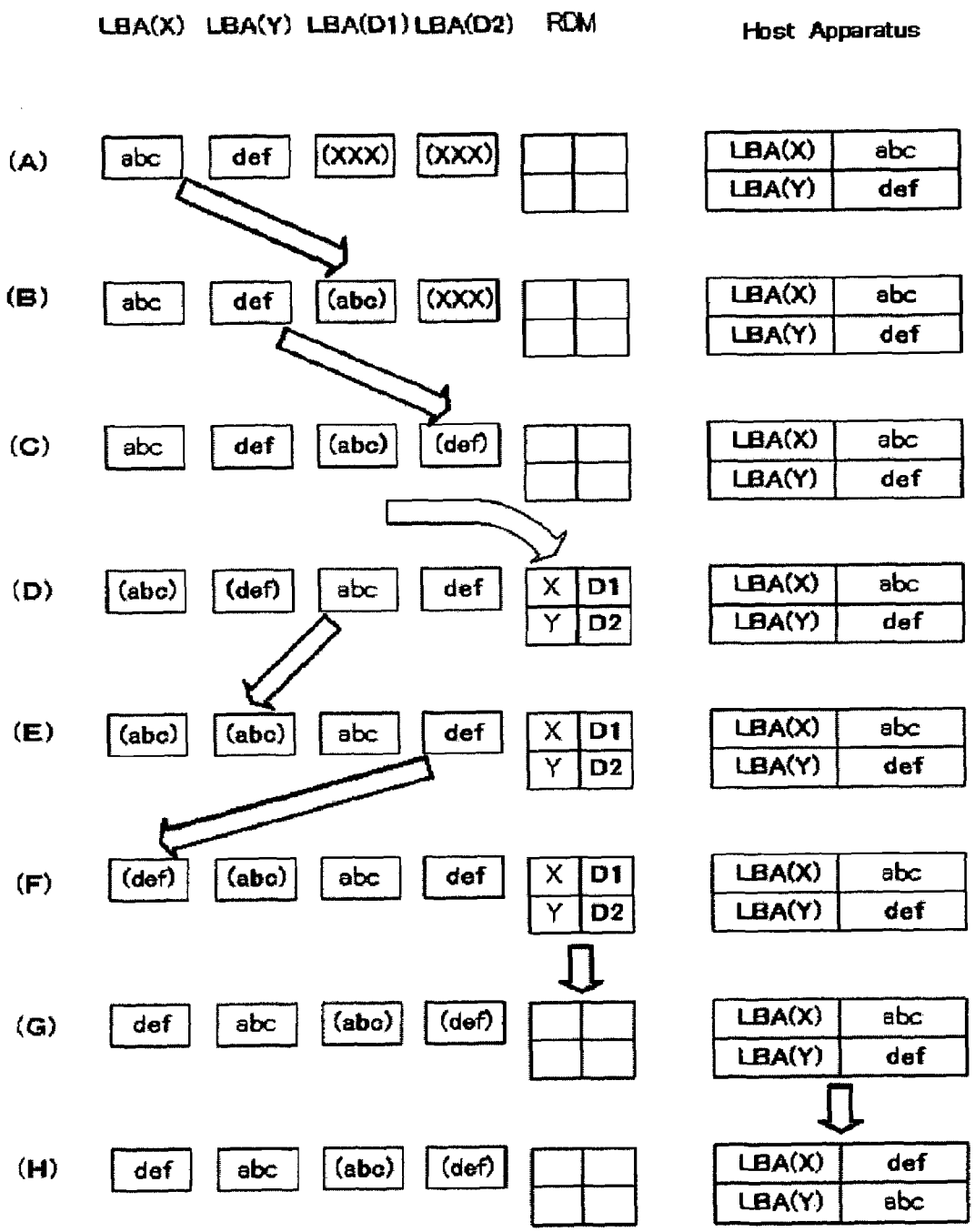
FIG. 6 is a diagram for explaining a method for swapping stored data between clusters in a magnetic disk drive.
Figure 7:
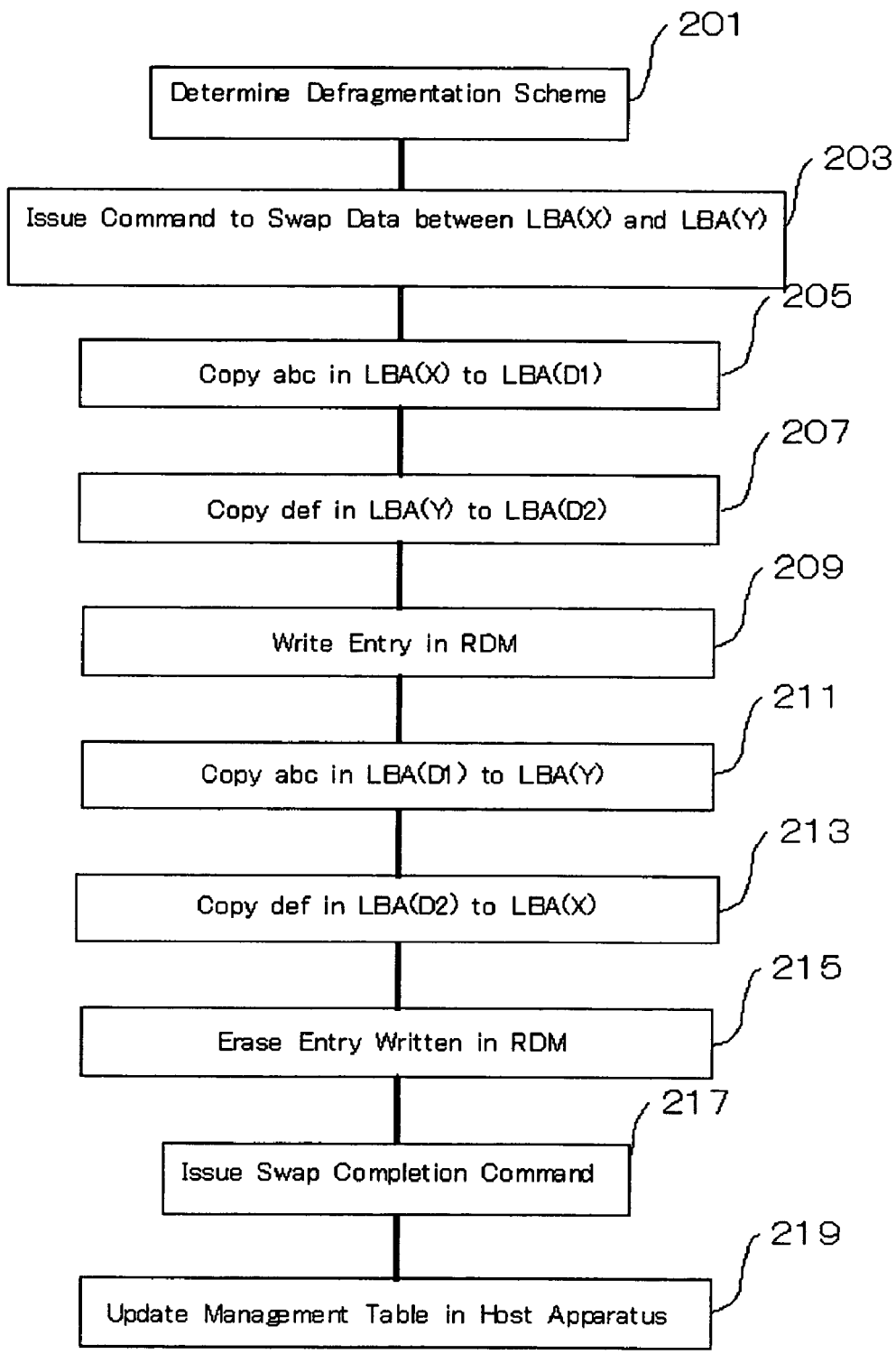
FIG. 7 is a flowchart for explaining a method for swapping stored data between clusters in a magnetic disk drive.

With reference to FIGS. 6 and 7, the following describes a method of swapping data between clusters in the magnetic disk drive 10 for defragmentation. Since defragmentation is to reallocate data among sectors or clusters based on a defragmentation scheme determined by the host apparatus 55, swapping stored data between clusters may be necessary. Since the user sectors, dummy sectors, RDM and the management table in the host apparatus 55 are identical in configuration to those in FIG. 4 except that two dummy sectors LBA(D1) and LBA(D2) are used, the descriptions of them are omitted.

FIG. 6A indicates that on a magnetic disk 11, data abc is stored in user sector LBA(X) whereas data def is stored in user sector LBA(Y). This situation is recognized as it is both by the MPU 25 and the host apparatus 55. In each of dummy sectors LBA(D1) and LBA(D2), some data xxx is stored. Since no entries are written in the RDM, however, the MPU 25 does not access dummy sectors LBA(D1) and LBA(D2).

In block 201, the host apparatus 55 decides to swap data abc in user sector LBA(X) with data def in user sector LBA(Y) and sends to the magnetic disk drive 10 a command to activate the defragmentation executing program. In block 203, the host apparatus 55 sends a data swap command to the magnetic disk drive 10. The swap command is a command to swap data between user sector LBA(X) and user sector LBA(Y). Alternatively, this command may be designed to include the defragmentation executing program activation command. It is also possible to specify data swap between clusters instead of between sectors.

Receiving the swap command, the MPU 25 executes the defragmentation executing program in block 205. As shown in FIG. 6B, data abc in user sector LBA(X) is copied to dummy sector LBA(D1) by the MPU 25. However, since no entry is written in the RDM, the MPU 25 does not access dummy sector LBA(D1). Then, in block 207, the MPU 25 copies data def in user sector LBA(Y) to dummy sector LBA(D2) as shown in FIG. 6C. The MPU 25 also does not access dummy sector LBA(D2) since no entry is written in the RDM.

In block 209, as shown in FIG. 6(D), the MPU 25 writes entries in the RDM to map user sector LBA(X) to dummy sector LBA(D1) and user sector LBA(Y) to dummy sector LBA(D2). After this, the MPU 25 does not recognize the data stored in user sectors LBA(X) and LBA(Y) since attempts to access user sector LBA(X) or LBA(Y) results in referring to the RDM and accessing dummy sector LBA(D1) or LBA(D2).

In block 211, as shown in FIG. 6E, the MPU 25 copies data abc in dummy sector LBA(D1) to user sector LBA(Y). If the host apparatus 55 sends a command to access user sector LBA(Y), the MPU 25 accesses dummy sector LBA(D2) since user sector LBA(Y) is mapped to dummy sector LBA(D2) by the RDM entry referred to by the MPU 25. Thus, the data the host apparatus 55 expects in LBA(Y) is consistently recognized in the magnetic disk drive 10. In block 213, as shown in FIG. 6F, the MPU 25 copies data def in dummy sector LBA(D2) to user sector LBA(X). If the host apparatus 55 sends a command to access user sector LBA(X), the MPU 25 accesses dummy sector LBA(D1) since user sector LBA(X) is mapped to dummy sector LBA(D1) by the RDM entry referred to by the MPU 25. Thus, the data the host apparatus 55 expects in LBA(X) is consistently recognized in the magnetic disk drive 10.

In block 215, as shown in FIG. 6(G), the entries written in the RDM to map user sector LBA(X) to dummy sector LBA(D1) and user sector LBA(Y) to dummy sector LBA (D2) are erased. After this, if the MPU 25 is instructed to access user sector LBA(X) or user sector LBA(Y), the MPU 25 will directly access user sector LBA(X) or user sector LBA(Y) without accessing dummy sector LBA(D1) or dummy sector LBA(D2). At this point, since the host apparatus 55 considers that data abc and data def are yet stored in user sector LBA(X) and user sector LBA(Y), respectively, the data the host apparatus 55 expects is not consistently recognized in the magnetic disk drive 10.

In block 217, the MPU 25 sends a data swap completion command to the host apparatus 55. In block 219, the host apparatus 55 updates the management table entries according to the command so as to recognize that data abc is stored in user sector LBA(Y) and data def is stored in user sector LBA(X). This makes again what are recognized by the host apparatus 55 consistent with what are recognized by the magnetic disk drive 10. Since block 215 through block 219 are completed in a relatively short time, the possibility that the defragmentation operation may interrupt without maintaining the data consistency between the host apparatus 55 and the magnetic disk drive 10 is low, causing no trouble substantially at all.

Then, assume that the swap operation interrupts due to a power failure or some other reason before management table entries are updated in block 219 by the host apparatus 55 in response to a command transfer completion command received from the magnetic disk device 10 after the transmission in block 203 of a swap command from the host apparatus 55 to the magnetic disk device 10. According to the present embodiment, data consistency between the host apparatus 55 and the magnetic disk device 10 can be maintained even in this case as described below.

If the operation interrupts while data abc in user sector LBA(X) is being copied to dummy sector LBA(D1) in block 205, it is possible that data abc could not correctly be copied to dummy sector LBA(D1). However, the corresponding entry is not yet written in the RDM when the defragmentation is terminated. If a command to access user sector LBA(X) is received by the MPU 25 from the host apparatus 55, the MPU 25 will access user sector LBA(X). Thus, data consistency can be maintained between the magnetic disk device 10 and the host apparatus 55.

If the operation interrupts while data def in user sector LBA(Y) is being copied to dummy sector LBA(D2) in block 207, it is possible that data def could not correctly be copied to dummy sector LBA(D2). However, the corresponding entry is not yet written in the RDM when the defragmentation is terminated. If a command to access user sector LBA(Y) is received by the MPU 25 from the host apparatus 55, the MPU 25 will access user sector LBA(Y). Thus, data consistency can be maintained between the magnetic disk device 10 and the host apparatus 55.

Assume that interruption occurs while entries to respectively map user sectors LBA(X) and LBA(Y) to dummy sectors LBA(D1) and LBA(D2) are being written in the RDM in block 209. Data consistency is maintained between the host apparatus 55 and the magnetic disk device 10 if writing the entries is either not started or completed since user sector LBA(X) or LBA(Y) will be accessed in the former case while dummy sector LBA(D1) or LBA(D2) will be accessed in the latter case. The amount of data written per entry in the RDM is very small and the EEPROM 43 allows high-speed write. Therefore, the possibility of causing such a write error as to map user sectors LBA(X) and LBA (Y) to some addresses other than dummy sectors LBA(D1) and LBA(D2) is very small. Furthermore, the RDM is typically duplicated as mentioned earlier to prevent such write errors from causing problems.

Assume that the operation interrupts while data abc in dummy sector LBA(D1) is being copied to user sector LBA(Y) in block 211. In this case, there is a possibility that data abc could not correctly be copied to user sector LBA (Y). At this time, however, if a command to access user sector LBA(Y) is received by the MPU 25 from the host apparatus 55, the MPU 25 accesses dummy sector LBA(D2) since the entry to map user sector LBA(Y) to dummy sector LBA(D2) is written. Therefore, the data the host apparatus 55 expects is consistently recognized by the magnetic disk device 10. Thus, data consistency is maintained.

Assume that the operation interrupts while data def in dummy sector LBA(D2) is being copied to user sector LBA(X) in block 213. In this case, there is a possibility that data def could not correctly be copied to user sector LBA (X). At this time, however, if a command to access user sector LBA(X) is received by the MPU 25 from the host apparatus 55, the MPU 25 accesses dummy sector LBA(D1) since the entry to map user sector LBA(X) to dummy sector LBA(D1) is written. Therefore, the data the host apparatus 55 expects is consistently recognized by the magnetic disk device 10. Thus, data consistency is maintained. As for interruption between block 215 and block 219, the description is provided earlier. Note that although a magnetic disk drive, an example of a rotary disk type storage device, has been described as an embodiment, the present invention is also applicable to such storage devices as PC cards and CF cards provided with semiconductor memories and processors.

In the present embodiment, as mentioned so far, a command to swap data between sectors or clusters can be executed within the magnetic disk drive after it is received from the host apparatus 55. Therefore transmitting data to and from the host apparatus 55 and receiving a plurality of commands from the host apparatus 55 are not necessary. This allows data swaps to be executed at high-speed while reducing the burden on the host apparatus. Use of the data swap method according to the present embodiment is not limited to defragmentation. This swap method can be used as a general method for swapping data between sectors or clusters in a magnetic disk drive while maintaining data consistency between the host apparatus and the magnetic disk device by reflecting the result to the management table of the file management system. Also note that although a RDM is used as a mapping table to map user sectors to dummy sectors, a mapping table dedicated for transferring or swapping recorded information may alternatively be provided separately from the RDM.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A storage device capable of performing data communication with a host apparatus, said storage device comprising:
  a first recording medium having source data blocks, destination data blocks and dummy blocks;
  a second recording medium having a mapping table which maps data blocks to dummy blocks;
  a processor controlling an operation of said storage device; and
  a third recording medium having a program stored therein, wherein said program comprises:
  code for receiving a transfer command from the host apparatus;
  code for copying information stored in a destination data block to a dummy block;
  code for, in the mapping table, writing an entry which maps the destination data block to the dummy block;
  code for copying information stored in a source data block to the destination block;
  code for erasing the entry written in the mapping table; and
  code for sending a transfer completion command to the host apparatus.

2. A storage device according to claim 1, wherein the destination data block is an unused data block.

3. A storage device according to claim 1, wherein the first recording medium is a rotary disk type recording medium.

4. A storage device according to claim 3, wherein the dummy blocks are prepared in system regions on the rotary disk type recording medium.

5. A storage device according to claim 3, wherein the mapping table is a relocation defect map by which defective sectors developed on the rotary disk type recording medium are mapped to alternate sectors.

6. A storage device according to claim 3, wherein each data block is a cluster which includes a set of plural sectors.

7. A storage device according to claim 3, wherein the transfer command is a transfer command for performing defragmentation.

8. A storage device capable of performing data communication with a host apparatus, said storage device comprising:
- a first recording medium having first data blocks, second data blocks, first dummy blocks and second dummy blocks;
- a second recording medium having a mapping table which maps data blocks to dummy blocks;
- a processor controlling an operation of said storage device; and
- a third recording medium having a program stored therein, wherein said program comprises:
  - code for receiving a swap command from the host apparatus;
  - code for copying the information stored in a first data block to a first dummy block;
  - code for copying the information stored in a second data block to a second dummy block;
  - code for, in the mapping table, writing entries by which the first data block is mapped to the first dummy block and the second data block is mapped to the second dummy block;
  - code for copying information stored in the first dummy block to the second data block;
  - code for copying information stored in the second dummy block to the first data block;
  - code for erasing the entries from the mapping table; and
  - code for sending a swap completion command to the host apparatus.

9. A storage device according to claim 8, wherein the first recording medium is a rotary disk type recording medium.

10. A storage device according to claim 9, wherein the first dummy blocks and the second dummy blocks are prepared in system regions on the rotary disk type recording medium.

11. A storage device according to claim 9, wherein the mapping table is a relocation defect map by which defective sectors developed on the rotary disk type recording medium are mapped to alternate sectors.

12. A storage device according to claim 9, wherein each data block is a cluster which includes a set of plural sectors.

13. A storage device according to claim 9, wherein the swap command is a swap command for performing defragmentation.

14. A method for swapping information stored in a first data block with information stored in a second data block in a storage device which has a recording medium containing first data blocks, second data blocks, first dummy blocks and second dummy blocks and is capable of communicating with a host apparatus, said method comprising:
- receiving a swap command from the host apparatus;
- copying information stored in a first data block to a first dummy block;
- copying information stored in a second data block to a second dummy block;
- in a mapping table to map data blocks to a dummy blocks table, writing entries by which the first data block is mapped to the first dummy block and the second data block is mapped to the second dummy block;
- copying the information stored in the first dummy block to the second data block;
- copying the information stored in the second dummy block to the first data block;
- erasing said entries from the mapping table; and
- sending a swap completion command to the host apparatus.

15. A defragmentation executing method for a storage device which has a recording medium containing source data blocks, destination data blocks and dummy blocks, and a host apparatus capable of performing data communication with the storage device, said method comprising:
- examining fragmentation of the medium;
- deciding to transfer stored information from a source data block to a destination data block;
- sending a stored information transfer command to the storage device;
- copying information stored in the destination data block to a dummy block in response to the transfer command;
- mapping in a mapping table said data blocks to said dummy blocks, wherein the storage device is configured to write an entry which maps the destination data block to the dummy block;
- copying information stored in the source data block to the destination block;
- erasing the entry from the mapping table;
- sending a transfer completion command to the host apparatus; and
- updating an entry in a file management system in response to the transfer completion command.

16. A fragmentation executing method according to claim 15, wherein allowing the host apparatus to update an entry in a file management system includes changing an attribute of the source data block to unused.

17. A fragmentation executing method according to claim 15, wherein said host apparatus is a hard disk recorder or an MP3 recorder/player.

18. A defragmentation executing method for a storage device which has a recording medium containing first data blocks, second data blocks, first dummy blocks and second dummy blocks, and a host apparatus capable of performing data communication with the storage device, said method comprising:
- examining fragmentation of the medium;
- deciding to swap stored information between a first data block and a second data block;
- sending a stored information swap command to the storage device;
- copying information stored in the first data block to a first dummy block in response to the swap command;
- copying information stored in the second data block to a second dummy block;
- mapping in a mapping table said data blocks to said dummy blocks, wherein the storage device is configured to write entries by which the first data block is mapped to the first dummy block and the second data block is mapped to the second dummy block;
- copying the information stored in the first dummy block to the second data block;
- copying the information stored in the second dummy block to the first data block;
- erasing said entries from the mapping table;
- sending a swap completion command to the host apparatus; and
- updating entries in a file management system in response to the swap completion command.

19. A defragmentation executing method according to claim 18, wherein each data block is a cluster which includes a set of plural sectors.

* * * * *